United States Patent

[11] 3,577,850

[72] Inventor Rano J. Harris, Sr.
  Baton Rouge, La.
[21] Appl. No. 762,791
[22] Filed Sept. 26, 1968
[45] Patented May 11, 1971
[73] Assignee Precision Sampling Corporation

[54] METHOD OF FORMING SEALS
  8 Claims, 3 Drawing Figs.
[52] U.S. Cl. ............................................. 29/510,
  29/517, 29/520, 222/386, 264/249, 277/1
[51] Int. Cl. ....................................... B21d 39/00,
  B23p 11/00
[50] Field of Search........................................ 29/510,
  517, 520; 222/386; 264/249; 277/1

[56] References Cited
UNITED STATES PATENTS

| | | | |
|---|---|---|---|
| 1,254,161 | 1/1918 | Sawyer | 264/249X |
| 1,459,778 | 6/1923 | Leytham | 264/249X |
| 2,052,616 | 9/1936 | Gardes | 264/249X |
| 3,189,672 | 6/1965 | Lyman | 29/510X |
| 3,261,909 | 7/1966 | Rust et al. | 264/249X |
| 3,325,061 | 6/1967 | Ellsworth | 222/386 |
| 3,464,412 | 9/1969 | Schwartz | 222/386X |
| 3,503,542 | 3/1970 | Ungerer | 222/386 |

Primary Examiner—Charlie T. Moon
Attorney—Llewellyn A. Proctor

ABSTRACT: A method, and the apparatus formed by encapsulating and stress forming a thermoplastic material upon a male member, e.g., the needle or plunger of a syringe, or both, to provide a durable and effective leakproof seal when inserted within enclosing walls defining an opening of restricted diameter. A portion of the said male member is capped with an oversized thermoplastic material, the cap is then reduced in size to correspond to the diameter of the member with which it is to be mated in forming the seal, and then heated up to or just below the softening temperature of the thermoplastic material, generally up to about 425° F., and preferably to about 300° F. The heat stressed member, which is characterized as having very thin layers or films of the stress formed thermoplastic covering the external surface of the member, can then be inserted into snug fit within the mating bore, e.g., the barrel of a syringe, and the tight fit will endure because of the elastic memory of the material by virtue of which it tends to expand to its former size and shape thereby pressing against the enclosing sidewalls forming the bore.

Patented May 11, 1971

3,577,850

METHOD OF FORMING SEALS

In high accuracy, high precision prior art syringe constructions generally, the plunger and bore of the syringe barrel are precisely fitted. Both plunger and bore are generally round and free of taper to minimize interference, while yet allowing free movement of the plunger. The forward end or tip of the plunger is capped or covered with a suitable rubber or plastic material to form a movable seal. A ring of elastic material thus contacts the inside wall around the circumference of the barrel to provide sealing engagement. In this manner, escape of fluid around the annulus of the plunger is suppressed or prevented.

In such constructions also, a tubular needle is fitted upon the forward end of the barrel, and communicated with the bore thereof. Often the needle is cemented, packed, or sealed into the forward end of the barrel in fixed position to prevent or suppress leakage of fluid around the annulus of the needle.

Seals such as these and other types, whether fixed or movable, have proven generally satisfactory, but not so for high precision micro and semimicro syringes, particularly where the fluid specimens, especially gas, must be handled at high temperatures, and withdrawn or injected against high pressures.

One difficulty with such seals is that the materials of which they are constructed all too rapidly lose their elasticity. Thus, even though a seal is sufficiently elastic ab initio to form a good snug fit, this condition does not endure. Often, the materials simply deteriorate, but even durable materials are known to cold flow. For example, the polytetrafluoroethylenes, e.g., Teflon, are known to form very good seals initially. Unfortunately, however, these materials cold flow and all too soon, e.g., the seal becomes loose so that leakage and inaccuracy result. In an effort to partially overcome this problem, e.g., plungers are often removed from the barrels and the plunger seals are heated in hot liquid, e.g., water, to produce expansion of the seal. The plunger is then placed in the syringe barrel for use in withdrawing and delivering a measured amount of a fluid specimen. This procedure is not only unsatisfactory in providing adequate sealing, but is quite burdensome. Such procedure is even less satisfactory, if at all feasible, when considered with respect to needle seals, or other fixed seals.

In recently issued U.S. Pat. No. 3,325,062, however, issued to a present inventor, syringes are described which have proven admirably suitable for the introduction of fluids, especially gases, into high pressure, high temperature systems. Such syringes are characterized, in part, by plungers, the forward ends of which are provided with gas filled seals, integral and movable with the plungers. The surface of the plungers are underscored, fitted with O-rings, covered with tightly fitting expandable or resilient caps, and then filled with gas sufficient to cause the outer surfaces of the caps to bulge outwardly to press tightly and snugly against the inside circumference of the barrel to form effective leakproof seals. In this manner, fluids can be withdrawn or ejected from the syringes, even against high temperatures and pressures, without escape thereof around the annulus of the plunger.

While these seals have proven durable and eminently satisfactory, as well as having filled a long felt need in the art, such seals are not generally satisfactory when the diameter of the plunger on which the seals are to be used is equal to or less than about 0.042 inch. Unfortunately, however, it is often necessary or desirable in high accuracy, high precision instrumentation to construct syringes with plunger diameters of 0.042 inch and less. Seals of these relatively small diameters become less and less effective as the diameters of the plungers are made smaller and smaller below this figure as is necessary for many micro and semimicro measurements. Consequently, further improvements in plunger seals, especially small diameter seals, are desired to serve the needs of industry. Moreover, improvements are needed in fixed seals to prevent leakage of fluid about the annuli of needles.

It is accordingly the primary objective of this invention to obviate the foregoing and other prior art deficiencies, and also fulfill the present needs.

In particular, it is an object to provide highly accurate syringes adapted to measure and inject fluids at high precision, at relatively high temperature and pressures, directly into analytical devices without significant leakage.

Another object is to provide syringes, of micro and semimicro capacities, with improved movable and fixed seals.

A further object is to provide new and novel stress formed seals, and as well a method for forming such seals.

These and other objects are achieved in accordance with the present invention by virtue of which new and novel thermoplastic seals, of critical dimensions, are formed and shaped upon rigid members. The seals, when formed, are reduced in size and stressed so that when operatively positioned with enclosing walls defining a confined space, approximating that at which they were stressed, they constantly exert pressure against the enclosing walls sufficient to form a leakproof seal due to a tendency to return to their original size.

Thermoplastic materials, of critical dimensions, can thus be snugly fitted over solid, subcomponent male members, e.g., syringe plungers and needles, or both, shaped, reduced in size, and, while restrained at the smaller size, heat-set at temperatures below the softening temperature of the thermoplastic materials. The thermoplastic material will thus possess a tendency to reexpand to its original larger diameter so that when positioned in an area of limited space, an outward thrust is exerted against a retaining wall. The so-encapsulated end portion of a syringe plunger or needle will thus exert a thrust around the circumference of the internal barrel wall to form a leakproof perpetually tight seal.

The present invention is based in part on the characteristics of various thermoplastic organic materials which can be heat-set, resized and reshaped, at temperatures up to or just below their softening points. The heat-set materials of such character, while they will take on a new size and shape, will nonetheless possess an "elastic memory" of their former shape and size and will constantly seek to return to their former position. Organic materials including polyamides, polyesters, polyvinyl chloride and materials sold under the trade names "Nylon," "Perlon" and under the registered trade mark "Terylene" are illustrative of such materials. The polyfluoroethylenes, particularly polytetrafluoroethylene sold under the trade name "Teflon," are also illustrative and, in fact, these self-lubricating plastics are particularly preferred materials used in the practice of the present invention. The desired temperature of setting varies with the specific nature of the material, and to some extent with time. In general, however, it is found that heat-setting is accomplished quite readily at temperature ranging up to about 425° F. and preferably at temperatures ranging from about 200° F. to about 300° F.

The invention is also based in part on maintaining the heat stressed thermoplastic seal as a relatively thin skin or membrane, at the locations of contact with the enclosing walls along which the sealing feature is provided.

These and other salient features and advantages of the invention are further and more fully described in the following detailed description which makes reference to the attached drawings:

Referring to the drawings.

Figure 1:
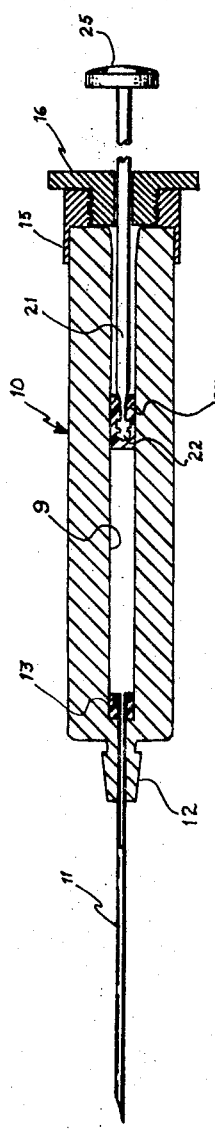
FIG. 1 depicts an elevational view of a syringe, in partial section, provided with a needle and plunger with stress formed seals of type embodying the present invention.

Referring to FIG. 1, there is shown a syringe 10 formed by enclosing walls defining a tubular member or barrel 9. The barrel 9 is provided with an outwardly extending flange 16, and it is secured to the end of the barrel via threadable engagement with extension member 15 which, likewise, can be threadably engaged, cemented or otherwise secured to the barrel.

The forward end of the barrel 9 is provided with a hollow or tubular needle 11, the rear portion of which is position through a shank or tip 12 and secured tightly therein to provide stability. The rear portion of the needle 11 is fitted snugly with a seal 13 which, in itself, is tightly fitted within the bore to prevent leakage of fluid about the needle annulus. The needle 11 is in open communication with the interior, or bore, of the barrel 9. Fluid can be withdrawn from a source (not shown) to enter the bore, and thereafter can be dispersed or ejected.

The barrel 9 is provided with a plunger 21 which is movable within the barrel. A handle or thumb-button 25 facilitates the movement of the plunger 21 to withdraw or eject fluids from the barrel via passage through the needle 11. The plunger 21 is constructed of any suitable material, e.g., stainless steel, spring wire or other resilient material, preferably metal. As heretofore suggested, the plunger diameters of micro and semimicro syringes often range 0.042 inch and smaller.

Referring specifically to the plunger 21, it will be observed that the forward end thereof is encapsulated by a capping member 23 which, when shaped and heat-set in accordance with this invention, constantly seeks to expand to a larger diameter by virtue of an "elastic memory" of its former larger size. The heat stressed capping member 23 is thus thrust circumferentially outwardly against the internal wall surface of the barrel 9 thereby effectively maintaining a snug and enduring fit, as well as sealing the annulus between the external surface of the plunger 21 and the internal wall surface of the barrel 9. It will also be observed that the needle 11 is also provided with a stress formed seal 13, which can be shaped and heat-set in accordance with the practice of this invention.

Figure 3:
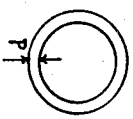
FIG. 3 depicts an enlarged view, taken on line 3—3 of FIG. 2e, of a completed plunger, showing the critical dimensions of a seal embodying the present invention.
Figure 2:
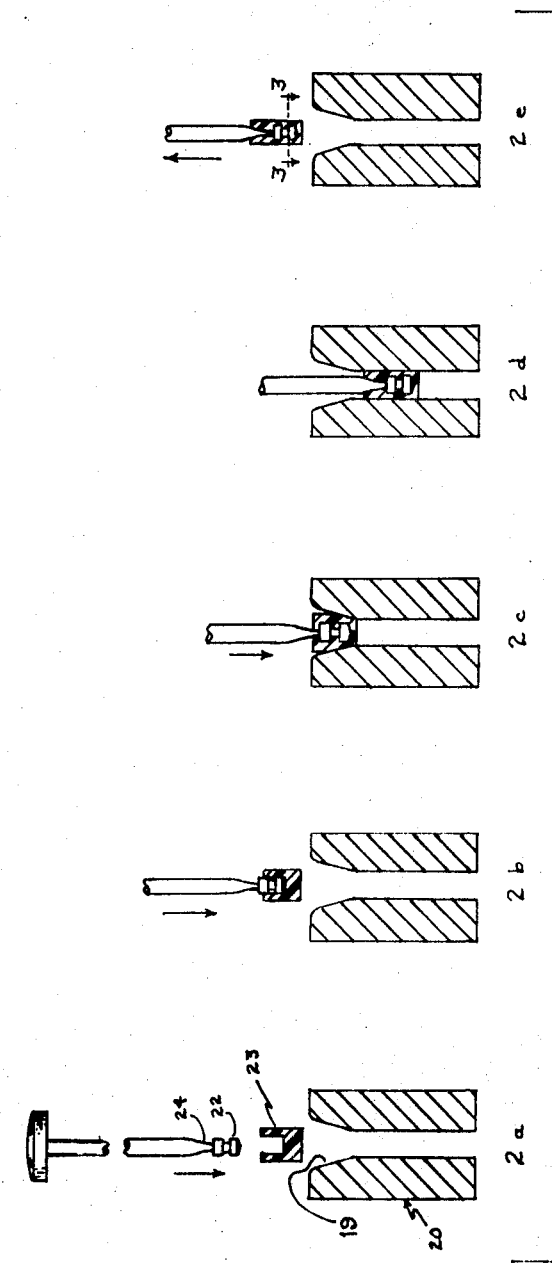
FIG. 2 depicts graphically the process, or series of progressive steps (2a through 2e), employed from start to completion in shaping and stress forming a seal, e.g., a plunger seal.

The concept of the general process of forming a tight and more enduring seal will be more fully appreciated by specific reference to FIGS. 2 and 3. These FIGS. graphically depict the stress forming technique, and show as well certain critical dimensions which must be observed in forming such seals. While the FIGS. show forming a seal on the forward end of a plunger, it is, of course, understood that the same technique is also applicable to other rigid members, e.g., a needle or other member, which necessitate, as a part of their function, fixed or movable placement within enclosing walls defining a restriction or opening.

The sequence of five FIGS. –viz, 2a through 2e–shows generally the capping of the forward end of a plunger, the shaping and encapsulation of the forward end, completion of the stress forming within a mold and its removal therefrom as a completed plunger ready for use by insertion in a syringe barrel.

In referring to the sequence described by reference to FIG. 2, there is shown a die or mold 20 provided with an internal opening sized to correspond in diameter with that of the bore of the barrel in which the finished plunger is to be used. It is to be understood, of course, that a seal can be formed in situ within the bore of the syringe or other device within which it is to be used.

The forward end of the plunger 21 is roughened, anodized, or underscored more preferably by one or a plurality of circumferential grooves 22. The function of the groove 22 is to provide a nonsmooth surface for retention of an open centered thermoplastic cap 23, after insertion of the forward end of the plunger therein as shown by reference to FIGS. 2a and 2b.

The thermoplastic cap 23, it will be observed, is initially of larger diameter than the axial opening of the die or mold 20. As the plunger 21 is thrust forward, as shown by reference to FIGS. 2b, 2c and 2d, the cap 23 is brought into contact with the enlarged frustoconic-shaped opening 19, and as the forward movement of the plunger 21 is continued, the cap 23 enters the axial opening and is reduced in diameter; ultimately to the diameter of axial opening. As the reduction in size of cap 23 progresses, the excess thermoplastic material is initially rejected and gradually forced backward to cover the whole forward end of the plunger, which is of slightly less diameter than that of the axial opening. Eventually, the thermoplastic material fills virtually the whole, or nearly the whole, of the volume of the recessed portion 24 of the plunger.

In a preferred syringe combination, a plunger is thus provided with a recessed portion which trails the forward end of the plunger. The recessed portion is sufficiently large to retain the excess thermoplastic material as the diameter of the initial capping member is reduced to the desired dimension. Preferably, the recessed portion provides a volume substantially equal to, or almost equal to, the volume of the thermoplastic material displaced. The forward end of the completed plunger will be provided with a surface of thermoplastic material, and the sum-total diameter of the encapsulated forward end will thus be equal to, or almost equal to, the diameter of the nonencapsulated portion of the plunger.

Once the entire encapsulated forward end of the plunger is contained within the axial opening, the thermoplastic material is heat-set by raising the temperature of the mold 20 up to or just below the softening temperature of the material of which cap 23 is composed. As heretofore suggested, temperatures ranging up to about 425° F., and preferably from about 200° F. to about 300° F., are sufficient. Of course, the mold 20 can be preheated to the desired temperature prior to insertion of the plunger.

Upon withdrawal of the plunger 21, as shown by reference to FIG. 2e, the stress forming and formation of the seal is completed. The plunger 21, with its so-formed seal, is now ready for insertion into the barrel or bore of a syringe 10, e.g., as shown by reference to FIG. 1. As indicated heretofore, a seal 13 can be formed for needle 11, or any male member, in similar fashion.

In the completed seals, it is absolutely essential that the thickness of the skin or membrane of stress formed thermoplastic material which contacts the surrounding walls of an opening be relatively thin. Thus, with reference to FIG. 3, the single thickness $d$ of the encapsulating film formed on rigid members of diameter ranging from about 0.025 inch to about 0.042 inch should range from about 0.001 inch to no greater than about 0.005 inch. Thicknesses ranging from about 0.0015 inch to about 0.0025 inch are most preferred. Seals constructed in accordance with such requirements have been found to fit quite tightly for indefinite periods of time without becoming loose. In fact, such seals actually become a little tighter as time passes. Consequently, the seals are quite durable and remain virtually leakproof even when subjected to high temperature high-pressure service. Teflon seals formed in accordance with these requirements, e.g., have provided outstanding service and the normal cold flow associated with this material has had little effect, if any, in lessening tight fits.

The relative thinness of the layers of stress formed thermoplastic material between the male member, or plunger, and the enclosing wall is a key and novel feature in providing the enduring tight fit. It is essential. Thick layers will not accomplish this result, even when the layers are of stress formed thermoplastic materials. This is because the thin layers are less affected by loss of elasticity and cold flow than the thicker layers. This can be conveniently explained by assuming a given percent loss of elasticity over a period of time for a specific stress formed thermoplastic material, e.g., 2 percent loss over a given interval of time. One can thus readily visualize the effect of a 2 percent loss of elasticity in a 0.001 inch membrane as compared, e.g., with a membrane of 0.1 inch thickness. The adverse effect of a 2 percent loss in elasticity will thus have a 100 times greater effect on the latter than on the former. Considerably less force will be exerted against an enclosing wall by the thicker membrane. Such loss of force will hardly be measurable, however, in the thinner membrane. Hence, the thicker membrane is entirely ineffective in providing an enduring light fit as is sharply contrasted with the thinner membrane.

EXAMPLE 1

By way of illustration, a micro syringe was formed utilizing, in formation of the plunger, an 0.018 inch outside diameter stainless steel wire. The forward end of the plunger was roughened and grooved by etching with a file. The outside diameter of the wire forming the forward end of the plunger was reduced to between about 0.012—0.013 inch, and a recessed portion was provided just behind the forward now enlarged end. The relatively large forward end of the plunger, about three thirty-seconds inch in length, was then partially covered with a 0.026 inch outside diameter Teflon cap having an opening about 0.012 inch inside diameter, and one sixteenth inch in depth. The plunger was pressed into a bore having an internal diameter of 0.019 inch, and heated to 300° F.

It was found that the stress formed Teflon encapsulated plunger could be used in the bore of the syringe, which had an inside diameter of 0.019 inch, to provide an enduring leakproof seal. The seal was capable of withstanding relatively high pressures and temperatures in withdrawing and delivering fluids, even gases, with high accuracy and precision.

EXAMPLE 2

When a syringe having a bore of 0.042 inch internal diameter was formed from a stainless steel wire initially 0.032 inch in diameter in similar manner to provide stress formed layers, a single thickness of which was 0.005 inch, a high durability leakproof seal was again obtained. Gas, at high accuracy and precision, was delivered by the syringe to a G.C. column against a pressure of 500 p.s.i.g.

It is apparent that various modifications and changes can be made without departing the spirit and scope of the invention.

I claim:

1. A method of encapsulating and stress forming a thermoplastic material upon a male member to form, with enclosing walls defining a restricted opening of preselected diameter, a durable effective leakproof seal for openings corresponding to the said preselected diameter comprising:

reducing the original outside diameter of a portion of a male member around its circumference to provide a retention surface, covering in part the portion of the male member of reduced diameter with a thermoplastic cap of larger outside diameter than that of the opening, forcing the capped end of the male member into the restricted opening to reduce the outside diameter of the cap to correspond to that of the said opening, providing an encapsulated portion having a membrane thickness in contact with the enclosing walls ranging no greater than about 0.005 inch, and then heating the capped end of the male member contained within the restricted opening up to the softening temperature of the thermoplastic material of which the cap is composed.

2. The method of claim 1 wherein the male member is suitable for use as a plunger for a syringe and the terminal end thereof is reduced in diameter, a portion of the member behind and adjacent to the terminal end is further reduced in diameter to provide a recessed portion, and the volume of the recessed portion is sufficient to contain the thermoplastic material when the cap is reduced in diameter.

3. The method of claim 2 wherein the original outside diameter of the plunger, inclusive of the total thickness of the membrane, ranges up to about 0.042 inch in diameter.

4. The method of claim 2 wherein the thermoplastic material is Teflon.

5. The method of claim 1 wherein the thermoplastic cap, after reduction in size, is heated to temperatures ranging up to about 425° F.

6. The method of claim 5 wherein the temperature ranges from about 200° F. to about 300° F.

7. The method of claim 1 wherein the membrane thickness of the thermoplastic material ranges from about 0.001 inch to about 0.005 inch.

8. The method of claim 1 wherein the male member is a tubular needle, suitable for use in a syringe.